United States Patent
Carbune et al.

(10) Patent No.: US 11,996,094 B2
(45) Date of Patent: May 28, 2024

(54) AUTOMATED ASSISTANT WITH AUDIO PRESENTATION INTERACTION

(71) Applicant: Google LLC, Mountain View, CA (US)

(72) Inventors: Victor Carbune, Zurich (CH); Matthew Sharifi, Kilchberg (CH)

(73) Assignee: GOOGLE LLC, Mountain View, CA (US)

( * ) Notice: Subject to any disclaimer, the term of this patent is extended or adjusted under 35 U.S.C. 154(b) by 381 days.

(21) Appl. No.: 16/947,030

(22) Filed: Jul. 15, 2020

(65) Prior Publication Data
US 2022/0020365 A1 Jan. 20, 2022

(51) Int. Cl.
*G10L 15/22* (2006.01)
*G06F 3/16* (2006.01)
(Continued)

(52) U.S. Cl.
CPC ............ *G10L 15/22* (2013.01); *G06F 3/165* (2013.01); *G10L 15/16* (2013.01); *G10L 15/183* (2013.01); *G10L 15/26* (2013.01)

(58) Field of Classification Search
CPC ......... G10L 15/16; G10L 15/22; G10L 15/26; G10L 15/30; G10L 15/183; G10L 15/1822; G06F 40/35; G06F 40/279; G06F 16/433; G06F 16/65; G06F 16/3329; G06F 3/165; G06F 3/167
See application file for complete search history.

(56) References Cited

U.S. PATENT DOCUMENTS

| 10,147,424 B1 | 12/2018 | Indyk |
| 2010/0232759 A1* | 9/2010 | Suga ........................ H04N 5/76 386/200 |

(Continued)

FOREIGN PATENT DOCUMENTS

| EP | 3550454 | 10/2019 |
| EP | 3664461 | 6/2020 |

(Continued)

OTHER PUBLICATIONS

TranscribeMe! "Speech Recognition Training: Using Annotated Data to Improve Machine Learning;" [https://www.transcribeme.com/speech-recognition-training-annotated-data-improves-machine-learning], 2 pages; May 22, 2019.

(Continued)

*Primary Examiner* — Michelle M Koeth
*Assistant Examiner* — Paul J. Mueller
(74) *Attorney, Agent, or Firm* — Gray Ice Higdon (57) ABSTRACT

User interaction may be supported with an audio presentation by an automated assistant, and in particular with the spoken content of such an audio presentation that is presented at particular points within the audio presentation. Analysis of an audio presentation may be performed to identify one or more entities addressed by, mentioned by, or otherwise associated with the audio presentation, and utterance classification may be performed to determine whether an utterance received during playback of the audio presentation is directed to the audio presentation, and in some instances, to a particular entity and/or point of playback in the audio presentation, thereby enabling a suitable response to be generated to the utterance.

12 Claims, 6 Drawing Sheets

(51) Int. Cl.
*G10L 15/16* (2006.01)
*G10L 15/183* (2013.01)
*G10L 15/26* (2006.01)

(56) References Cited

U.S. PATENT DOCUMENTS

| | | | | |
|---|---|---|---|---|
| 2013/0080159 | A1* | 3/2013 | Sharifi | H04L 67/561 |
| | | | | 704/E15.001 |
| 2014/0280291 | A1 | 9/2014 | Collins et al. | |
| 2015/0382079 | A1* | 12/2015 | Lister | G11B 27/28 |
| | | | | 725/38 |
| 2016/0306797 | A1* | 10/2016 | Taboriskiy | H04N 21/42203 |
| 2017/0017501 | A1 | 1/2017 | Quast | |
| 2017/0270919 | A1* | 9/2017 | Parthasarathi | G10L 25/87 |
| 2018/0061400 | A1* | 3/2018 | Carbune | G10L 15/26 |
| 2018/0069914 | A1* | 3/2018 | Abebe | H04N 21/8586 |
| 2018/0190264 | A1* | 7/2018 | Mixter | H04L 12/282 |
| 2018/0233137 | A1 | 8/2018 | Torok et al. | |
| 2018/0349093 | A1 | 12/2018 | McCarty et al. | |
| 2019/0273963 | A1* | 9/2019 | Jobanputra | G06F 3/165 |

FOREIGN PATENT DOCUMENTS

| | | |
|---|---|---|
| JP | 2013250490 | 12/2013 |
| JP | 2018182692 | 11/2018 |
| WO | 2017157428 | 9/2017 |

OTHER PUBLICATIONS

European Patent Office; International Search Report and Written Opinion of PCT/US2020/064929; 13 pages; dated Mar. 22, 2021.
Intellectual Property India; Examination Report issued in Application No. 202227057574; 8 pages; dated May 31, 2023.
Japanese Patent Office; Notice of Reasons for Rejection issued for Application No. 2022-564435, 11 pages, dated Nov. 20, 2023.
European Patent Office; Communication pursuant to Article 94(3) EPC issued in Application No. 20839471.8; 4 pages; dated Mar. 13, 2024.

* cited by examiner

AUTOMATED ASSISTANT WITH AUDIO PRESENTATION INTERACTION

BACKGROUND

Humans may engage in human-to-computer dialogs with interactive software applications referred to herein as "automated assistants" (also referred to as "chatbots," "interactive personal assistants," "intelligent personal assistants," "personal voice assistants," "conversational agents," etc.). For example, humans (which when they interact with automated assistants may be referred to as "users") may provide commands and/or requests to an automated assistant using spoken natural language input (i.e., utterances), which may in some cases be converted into text and then processed, and/or by providing textual (e.g., typed) natural language input. An automated assistant generally responds to a command or request by providing responsive user interface output, which may include audible and/or visual user interface output.

Automated assistants enable users to obtain information, access services, and/or perform various tasks. For example, users are able to execute searches, get directions, and in some cases, interact with third party computing services. Users may also be able to perform a variety of actions, such as calling cars from ride-sharing applications, ordering goods or services (e.g., pizza), controlling smart devices (e.g., light switches), making reservations, and so forth.

Automated assistants may converse with users using voice recognition and natural language processing, with some also utilizing machine learning and other artificial intelligence technologies, for instance, to predict user intents. Automated assistants may be adept at holding conversations with users in natural, intuitive ways, in part because they understand dialog context. To utilize dialog context, an automated assistant may preserve recent inputs from the user, questions that came from the user, and/or responses/questions provided by the automated assistant. For example, the user might ask, "Where is the closest coffee shop?", to which the automated assistant might reply, "Two blocks east." The user might then ask, "How late is it open?" By preserving at least some form of dialog context, the automated assistant is able to determine that the pronoun "it" refers to "coffee shop" (i.e., co-reference resolution).

Many automated assistants are also used to playback audio content such as music, podcasts, radio stations or streams, audio books, etc. Automated assistants running on mobile devices or standalone interactive speakers often include speakers or are otherwise connectable to headphones through which a user can listen to audio content. Conventionally, interaction with such audio content, however, has predominantly been limited to controlling playback, e.g., to start playback, to pause, to end playback, to skip forwards or backwards, to mute, or to change playback volume, or to querying an automated assistant for the information about the audio content as a whole, e.g., to obtain the title of a song or information about the artist that recorded the song. Particularly for audio presentations that incorporate spoken content, the range of automated assistant interactions are significantly limited.

SUMMARY

Techniques are described herein for supporting user interaction with an audio presentation by an automated assistant, and in particular with the spoken content of such an audio presentation that is presented at particular points within the audio presentation. Analysis of an audio presentation may be performed to identify one or more entities addressed by, mentioned by, or otherwise associated with the audio presentation, and utterance classification may be performed to determine whether an utterance received during playback of the audio presentation is directed to the audio presentation, and in some instances, to a particular entity and/or point of playback in the audio presentation, thereby enabling a suitable response to be generated to the utterance.

Therefore, consistent with one aspect of the invention, a method may include analyzing spoken audio content associated with an audio presentation to identify one or more entities addressed in the audio presentation, receiving a user query during playback of the audio presentation, and determining if the user query is directed to the audio presentation, and if the user query is determined to be directed to the audio presentation, generating a response to the user query, where determining if the user query is directed to the audio presentation or generating the response to the user query uses the identified one or more entities.

In some embodiments, analyzing the spoken audio content associated with the audio presentation includes executing speech recognition processing on the spoken audio content to generate transcribed text, and executing natural language processing on the transcribed text to identify the one or more entities. Also, in some embodiments, executing the speech recognition processing, executing the natural language processing, and receiving the user query are performed on an assistant device during playback of the audio presentation by the assistant device.

Further, in some embodiments, receiving the user query is performed on an assistant device during playback of the audio presentation by the assistant device, and at least one of executing the speech recognition processing and executing the natural language processing is performed prior to playback of the audio presentation. In some embodiments, at least one of executing the speech recognition processing and executing the natural language processing is performed by a remote service.

In addition, some embodiments may also include determining one or more suggestions using the identified one or more entities based on a particular point in the audio presentation. Some embodiments may also include presenting the one or more suggestions on an assistant device during playback of the particular point in the audio presentation by the assistant device. In addition, some embodiments may also include preprocessing responses to one or more potential user queries prior to receiving the user query using the identified one or more entities. Moreover, in some embodiments, generating the response to the user query includes using a preprocessed response from the one or more preprocessed responses to generate the response to the user query.

In some embodiments, determining if the user query is directed to the audio presentation includes providing transcribed text from the audio presentation and the user query to a neural network-based classifier trained to output an indication of whether a given user query is likely directed to a given audio presentation. Some embodiments may also include buffering audio data from the audio presentation prior to receiving the user query, and analyzing the spoken audio content associated with the audio presentation includes analyzing spoken audio content from the buffered audio data after receiving the user query to identify one or more entities addressed in the buffered audio data, and determining if the user query is directed to the audio presentation or generating the response to the user query uses the identified one or more entities addressed in the buffered audio data. Moreover, in some embodiments, the audio presentation is a podcast.

In some embodiments, determining if the user query is directed to the audio presentation includes determining if the user query is directed to the audio presentation using the identified one or more entities. In addition, in some embodiments, generating the response to the user query includes generating the response to the user query using the identified one or more entities. In some embodiments, determining if the user query is directed to the audio presentation includes determining if the user query is directed to a particular point in the audio presentation. Moreover, in some embodiments, determining if the user query is directed to the audio presentation includes determining if the user query is directed to a particular entity in the audio presentation.

Also, in some embodiments, receiving the user query is performed on an assistant device, and determining if the user query is directed to the audio presentation includes determining whether the user query is directed to the audio presentation rather than a general query directed to the assistant device. In some embodiments, receiving the user query is performed on an assistant device, and determining if the user query is directed to the audio presentation includes determining that the user query is directed to the audio presentation rather than a general query directed to the assistant device.

In addition, in some embodiments, determining if the user query is directed to the audio presentation further includes determining that the user query is directed to the assistant device rather than a non-query utterance. In addition, some embodiments may further include determining whether to pause the audio presentation in response to receiving the user query.

Moreover, in some embodiments, determining whether to pause the audio presentation includes determining whether the query can be responded to with a visual response, and the method further includes, in response to determining that the query can be responded to with a visual response, presenting the generated response visually and without pausing the audio presentation, and in response to determining that the query cannot be responded to with a visual response, pausing the audio presentation and presenting the generated response while the audio presentation is paused. Further, in some embodiments, determining whether to pause the audio presentation includes determining whether the audio presentation is being played on a pauseable device, and the method further includes, in response to determining that the audio presentation is not being played on a pauseable device, presenting the generated response without pausing the audio presentation, and in response to determining that the audio presentation is being played on a pauseable device, pausing the audio presentation and presenting the generated response while the audio presentation is paused.

Consistent with another aspect of the invention, a method may include, during playback of an audio presentation including spoken audio content, receiving a user query, and determining if the user query is directed to the audio presentation, and if the user query is determined to be directed to the audio presentation, generating a response to the user query, where determining if the user query is directed to the audio presentation or generating the response to the user query uses one or more entities identified from analysis of the audio presentation.

Consistent with another aspect of the invention, a method may include, during playback of an audio presentation including spoken audio content, buffering audio data from the audio presentation and receiving a user query, after receiving the user query, analyzing spoken audio content from the buffered audio data to identify one or more entities addressed in the buffered audio data, and determining if the user query is directed to the audio presentation, and if the user query is determined to be directed to the audio presentation, generating a response to the user query, where determining if the user query is directed to the audio presentation or generating the response to the user query uses the identified one or more entities.

In addition, some implementations may include a system including one or more processors and memory operably coupled with the one or more processors, where the memory stores instructions that, in response to execution of the instructions by one or more processors, cause the one or more processors to perform any of the aforementioned methods. Some implementations may also include an automated assistant device including an audio input device (e.g., a microphone, a line in input, a network or storage interface that receives digital audio data, etc.) and one or more processors coupled to the audio input device and executing locally stored instructions to cause the one or more processors to perform any of the aforementioned methods. Some implementations also include at least one non-transitory computer-readable medium including instructions that, in response to execution of the instructions by one or more processors, cause the one or more processors to perform any of the aforementioned methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
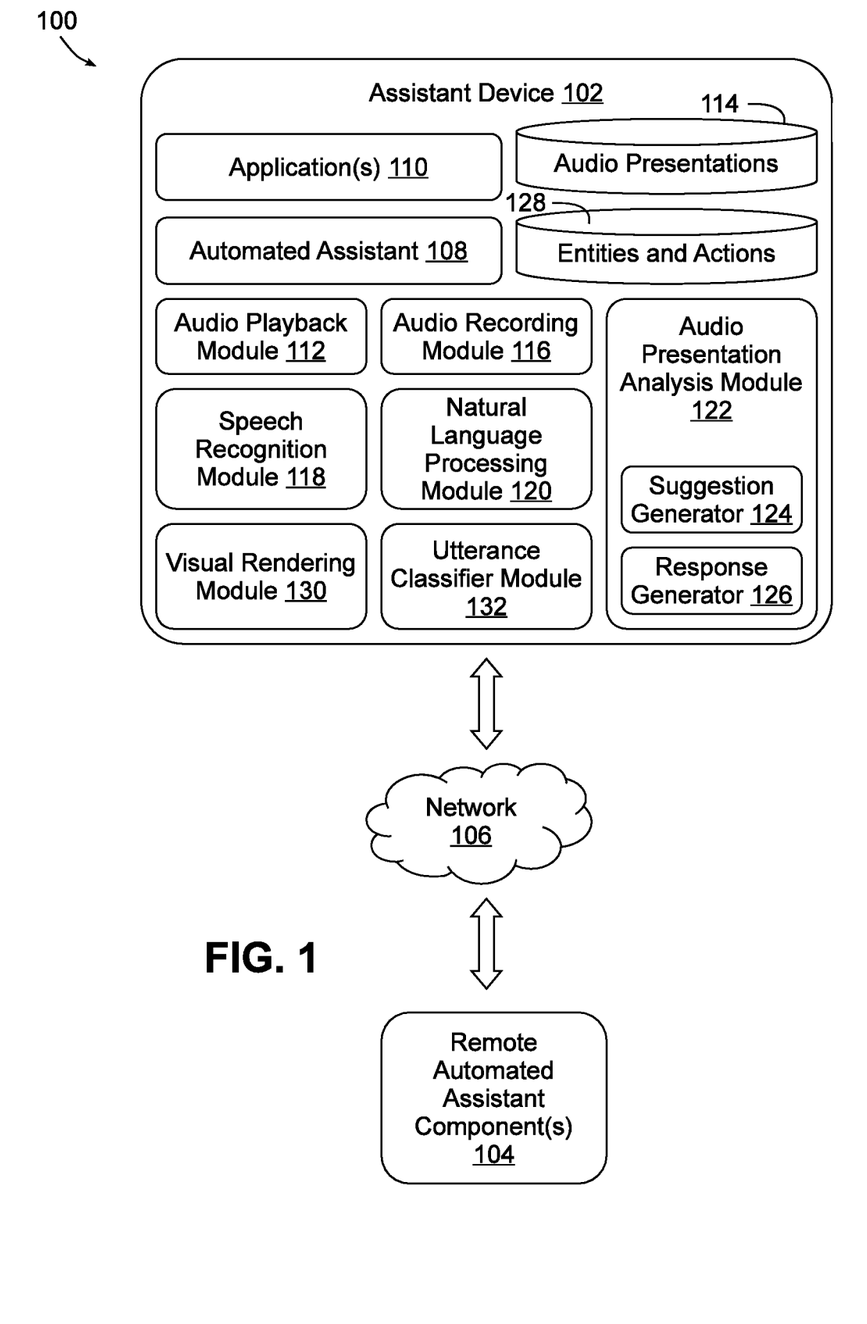
FIG. 1 is a block diagram of an example computing environment in which implementations disclosed herein may be implemented.

Now turning to FIG. 1, an example environment 100 in which techniques disclosed herein may be implemented is illustrated. The example environment 100 includes an assistant device 102 interfaced with one or more remote and/or cloud-based automated assistant components 104, which may be implemented on one or more computing systems (collectively referred to as a "cloud" computing system) that are communicatively coupled to assistant device 102 via one or more local and/or wide area networks (e.g., the Internet) indicated generally at 106. Assistant device 102 and computing device(s) operating remote or cloud-based automated assistant components 104 may include one or more memories for storage of data and software applications, one or more processors for accessing data and executing applications, and other components that facilitate communication over a network. The operations performed by an assistant device 102 and/or by automated assistant component(s) 104 may be distributed across multiple computer systems, e.g., as computer programs running on one or more computers in one or more locations that are coupled to each other through a network. In various implementations, for example, some or all of the functionality of an automated assistant may be distributed between multiple computer systems, or even to a client computing device. In some implementations, for example, the functionality discussed herein may be performed entirely within a client computing device, e.g., so that such functionality is available to a user even when no online connectivity exists. As such, in some implementations, an assistant device may include a client device, while in other implementations an assistant device may include one or more computer systems remote from a client device, or even a combination of a client device and one or more remote computer systems, whereby an assistant device is a distributed combination of devices. An assistant device may therefore in various implementations be considered to include any electronic device that implements any of the functionality of an automated assistant.

Assistant device 102 in the illustrated implementation is generally a computing device upon which an instance of an automated assistant client 108, by way of its interactions with one or more remote and/or cloud-based automated assistant components 104, may form what appears to be, from the user's perspective, a logical instance of an automated assistant with which the user may engage in a human-to-computer dialog. For the sake of brevity and simplicity, the term "automated assistant" as used herein as "serving" a particular user will refer to the combination of an automated assistant client 108 executing on an assistant device 102 operated by the user and one or more remote and/or cloud-based automated assistant components 104 (which may be shared amongst multiple automated assistant clients in some implementations).

Assistant device 102 may also include instances of various applications 110, which in some implementations may interact with or otherwise be supported by an automated assistant. Among the various applications 110 that may be supported include, for example, audio applications such as podcast applications, audiobook applications, audio streaming applications, etc. In addition, from a hardware perspective, assistant device 102 may include, for example, one or more of: a desktop computing device, a laptop computing device, a tablet computing device, a mobile phone computing device, a computing device of a vehicle of the user (e.g., an in-vehicle communications system, an in-vehicle entertainment system, an in-vehicle navigation system), a standalone interactive speaker, a smart appliance such as a smart television, and/or a wearable apparatus of the user that includes a computing device (e.g., a watch of the user having a computing device, glasses of the user having a computing device, a virtual or augmented reality computing device). Additional and/or alternative computing devices may be used in other implementations, and it will be appreciated that an assistant device in various implementations may utilize assistant functionality as its sole function, while in other implementations the assistant functionality may be a feature of a computing device that performs a vast array of other functions.

As described in more detail herein, an automated assistant engages in human-to-computer dialog sessions with one or more users via user interface input and output devices assistant device 102. Moreover, various additional components are resident in assistant device 102 in connection with supporting such sessions, and in particular, to support user interaction with audio presentations on the assistant device.

For example, an audio playback module 112 may be used to control playback of various audio presentations, e.g., one or more audio presentations resident in audio presentation storage 114, or one or more audio presentations that are streamed from a remote service. The audio playback may be presented to a user, for example, using one or more speakers of the assistant device 102, or alternatively, using one or more speakers in communication with assistant device 102, e.g., in headphones, ear buds, a car stereo, a home stereo, a television, etc. In addition to or in lieu of audio playback, an audio recording module 116 may be used to capture at least a portion of an audio presentation being played back by another device in the same environment as the assistant device, e.g., a radio playing in the vicinity of the assistant device.

An audio presentation, in this regard, may be considered to be any presentation of audio content, and in many instances, a presentation of audio content in which at least a portion of the audio content is spoken audio content containing human language speech. While in some implementations the audio content in an audio presentation may include music and/or singing, in many of the implementations discussed hereinafter, the focus is on audio presentations including non-singing spoken audio content with which a user may wish to interact, e.g., podcasts, audio books, radio programs, talk shows, news programs, sports programs, educational programs, etc. Audio presentations in some implementations may be directed to fictional and/or non-fictional subjects, and also in some implementations include visual or graphical content in addition to audio content, although in many implementations an audio presentation may be limited solely to audio content.

In the implementations discussed hereinafter, spoken audio content associated with an audio presentation may be analyzed to identify one or more entities addressed in the audio presentation, and such analysis may be used to perform various operations, such as generating suggestions associated with the spoken audio content for display or presentation to a user and/or responding to user queries posed by a user during playback of an audio presentation. In some implementations, for example, a user query may be received during playback of an audio presentation, and a determination may be made as to whether the user query is directed to the audio presentation, such that if the user query is determined to be directed to the audio presentation, an appropriate response to the user query may be generated and presented to the user. As will become more apparent below, the entities identified by the analysis may be used, for example, when attempting to determine if a user query is directed to an audio presentation and/or when generating a response to the user query.

To support such functionality, assistant device 102 may include various additional modules or components 118-132. A speech recognition module 118, for example, may be used to generate or transcribe text (and/or other suitable representations or embeddings) from audio data, while a natural language processing module 120 may be used to generate one or more entities. Module 118, for example, may receive an audio recording of voice input (e.g., in the form of digital audio data), and convert the digital audio data into one or more text words or phrases (also referred to herein as tokens). In some implementations, speech recognition module 118 is also a streaming module, such that voice input is converted to text on a token-by-token basis and in real time or near-real time, such that tokens may be output from module 118 effectively concurrently with a user's speech, and thus prior to a user enunciating a complete spoken request. Speech recognition module 118 may rely on one or more acoustic and/or language models, which together model a relationship between an audio signal and phonetic units in a language, along with word sequences in the language. In some implementations, a single model may be used, while in other implementations, multiple models may be supported, e.g., to support multiple languages, multiple speakers, etc.

Whereas speech recognition module 118 converts speech to text, natural language processing module 120 attempts to discern the semantics or meaning of the text output by module. For example, natural language processing module 120 may rely on one or more grammar models to map action text to particular computer-based actions and to identify entity text and/or other text that constrains the performance of such actions. In some implementations, a single model may be used, while in other implementations, multiple models may be supported, e.g., to support different computer-based actions or computer-based action domains (i.e., collections of related actions such as communication-related actions, search-related actions, audio/visual-related actions, calendar-related actions, device control-related actions, etc.). As an example, a grammar model (stored on assistant device 102 and/or remote computing device(s)) may map computer-based actions to action terms of voice-based action queries such as the action terms "tell me more about", "directions to", "navigate to", "watch", "call", "email", "contact", etc.

Moreover, while modules 118 and 120 may be used in some implementations for processing voice inputs or queries from a user, in the illustrated implementation modules 118 and 120 are additionally used to process spoken audio content from an audio presentation. An audio presentation analysis module 122, in particular, may analyze an audio presentation in part by utilizing modules 118 and 120 to generate various entities associated with an audio presentation. Alternatively, speech recognition and natural language processing may be performed using separate functionality from modules 118, 120, e.g., embedded within module 122. An entity, in this regard, may refer to practically any logical or semantic concept incorporated into spoken audio content, e.g., including but not limited to a topic, a person, a place, a thing, an event, an opinion, a fact, an organization, a date, a time, an address, a URL, an email address, a measurement, etc. associated with the spoken audio content in an audio presentation. Either of modules 118, 120 may also use additional content metadata (e.g., podcast title, description, etc.) to assist in identifying and/or disambiguating entities. The entities may also be logically associated with particular points in an audio presentation, e.g., where an entity for the topic "Battle of Verdun" includes an associated timestamp indicating that the topic was mentioned at 13:45 in a podcast about World War I. By associating entities with particular points in an audio presentation, the entities may be useful for responding to more ambiguous user queries, such as "what year did this happen" or "tell me more about this," as knowing what entities are being addressed when the user issues a query at a particular point during playback in many cases may assist with resolving ambiguous aspects of the query.

In the illustrated implementation, audio presentation analysis module 122 may be used to provide feedback to a user in at least two ways, although the invention is not so limited. It may be desirable in some implementations, for example, for an automated assistant to provide suggestions to a user during playback of an audio presentation, e.g., by displaying interesting facts or suggestions for queries that a user may want to issue at different points of the audio presentation. As such, module 122 may include a suggestion generator 124 capable of generating suggestions based upon the entities identified in the audio presentation (e.g., "Tap here to learn more about <personality> interviewed in podcast" or "Tap here to check-out the offer from <service being advertised>"). It may also be desirable in some implementations for an automated assistant to respond to specific queries issued by a user, and as such, module 122 may also include a response generator 126 for generating responses to particular queries. As will become more apparent below, either of generators 124, 126 may be used to generate suggestions and/or responses on demand (i.e., during playback and/or in response to specific queries), and in some implementations, either of the generators may be used to generate preprocessed suggestions and/or responses prior to playback of an audio presentation to reduce the processing overhead during playback and/or query processing.

To support module 122, an entities and actions storage 128 may store the entities identified in an audio presentation as well as any actions (e.g., suggestions, responses, etc.) that may be triggered in response to user input associated with any stored entities. While the invention is not so limited, in some implementations an action is analogous to a verb and an entity is analogous to a noun or pronoun, such that a query may identify or otherwise be associated with an action to perform and one or more entities that are the focus of the action. Thus, when executed, a user query may cause performance of a computer-based action in view of one or more entities referred to (either directly or indirectly via surrounding context) in the query (e.g., "what year did this happen" might map to a web search about the start date of the Battle of Verdun when the query is issued during a discussion of the Battle of Verdun).

It will be appreciated that storage 114, 128 may be resident locally in assistant device 102 in some implementations. In other implementations, however, storage 114, 128 may be partially or completely resident in one or more remote devices.

As noted above, suggestion generator 124 of audio presentation analysis module 122 may generate suggestions for presentation to a user of assistant device 102. In some implementations, assistant device 102 may include a display, and as such, it may be desirable to include a visual rendering module 130 to render visual representations of suggestions on an integrated display. Further, where visual responses to queries are supported, module 130 may also be suitable for generating textual and/or graphical responses to queries.

Yet another module utilized by automated assistant 108 is an utterance classifier module 132, which is used to classify any vocal utterances detected by automated assistant 108. Module 132 is generally used to detect voice-based queries from utterances spoken within the environment in which the assistant device 102 is located, as well as to attempt to determine the intent (if any) associated with the utterances. As will become more apparent below, in the context of the present disclosure, module 132 may be used to determine, for example, whether an utterance is a query, whether the utterance is directed to the automated assistant, whether the utterance is directed to an audio presentation, or even whether the utterance is directed to a particular entity and/or point in the audio presentation.

It will be appreciated that some or all of the functionality of any of the aforementioned modules and components illustrated as being resident in assistant device 102 may be implemented in a remote automated assistant component in other implementations. Therefore, the invention is not limited to the specific allocation of functionality shown in FIG. 1.

Figure 2:
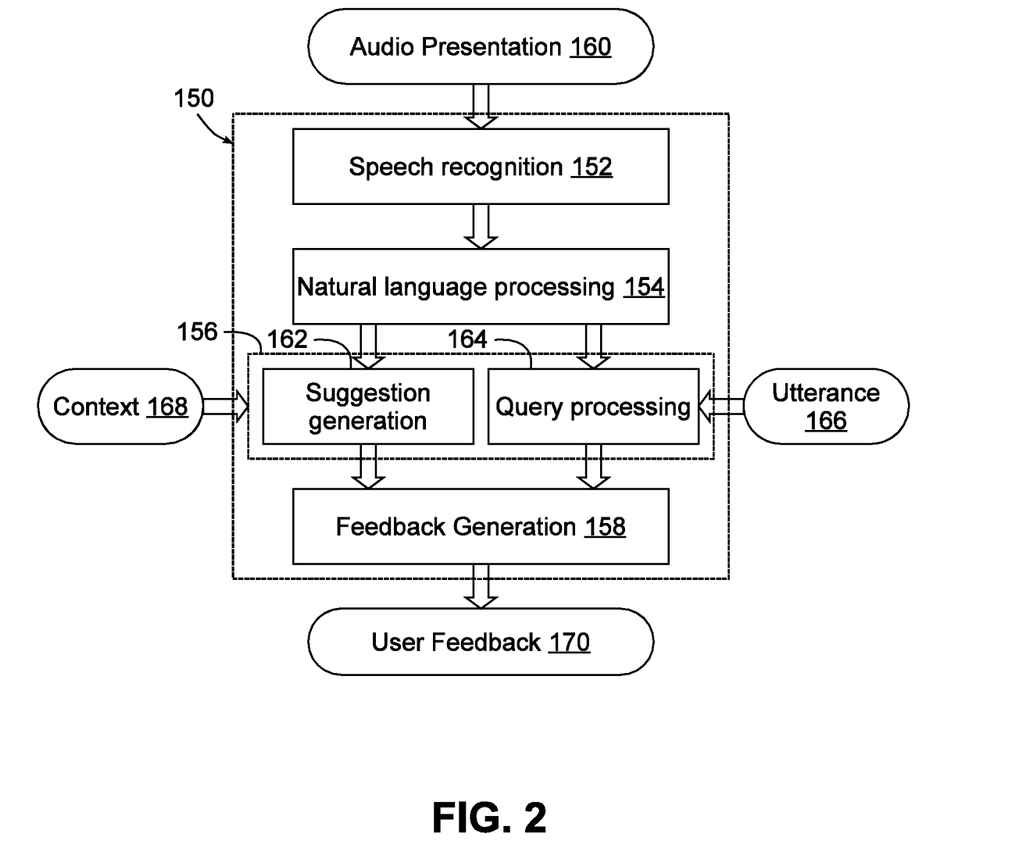
FIG. 2 is a block diagram of an example implementation of an example machine learning stack in which implementation disclosed herein may be implemented.

While the functionality described herein may be implemented in a number of different manners in different implementations, FIG. 2 next illustrates one example implementation that utilizes an end-to-end audio understanding stack 150 including four stages 152, 154, 156, 158 suitable for supporting audio presentation interactions with an automated assistant.

In this implementation, a first speech recognition stage 152 generates or transcribes text from an audio presentation 160, which is then processed by a second natural language processing stage 154 to annotate the text with appropriate entities or metadata. A third stage 156 includes two different components, a suggestion generation component 162 that generates suggestions from the annotated text, and a query processing component 164 that detects and determines the intent of queries issued by a user, e.g., provided as utterances 166. Each component 162, 164 may also utilize context information 168, e.g., prior user queries or biases, dialog information, etc., that may further be used in determining a user's intent and/or generating useful and informative suggestions for a particular user. A fourth feedback generation stage 158 may incorporate a ranking system that takes the cumulative options from components 162, 164 and surfaces to a user as user feedback 170 the most likely actions to perform based on their input or context that was passively listened to. In some implementations, stages 152, 154 may be implemented using similar neural networks to those used in an assistant stack to process the speech recognition pipeline and text annotations used to process user utterances, and may in many instances be run locally on an assistant device, or alternatively at least in part on one or more remote devices. Similarly, stages 156, 158 may be implemented in some implementations as extensions of an assistant stack, or alternatively using a custom machine learning stack separate from an assistant stack, and implemented either locally on an assistant device or partially or wholly on one or more remote devices.

In some implementations suggestion generation component 162 may be configured to generate suggestions that match content the user has or is currently listening to, and may perform actions such as performing searches or integrating with other applications, e.g., by surfacing deep links related to entities (or other application functionality). Moreover, query processing component 164 may determine the intent of queries or utterances issued by a user. Furthermore, as will become more apparent below, query processing component 164 may also be capable of interrupting or pausing playback of an audio presentation in response to a specific query, and may include a machine learning model that is capable of classifying whether a query is related to the audio presentation or is a general unrelated assistant command, and in some instances, whether the query is related to a particular point in the audio presentation or a particular entity referenced in the audio presentation. In some implementations, the machine learning model may be a multi-layered neural network classifier trained to output an indication of whether a given user query is likely directed to a given audio presentation, and using, for example, as input embedding layers of both the transcribed audio content as well as the user query, and returning one or more available actions if the user query is determined to be related to the audio content.

The feedback generation stage may, in some implementations, combine outputs from both of components 162, 164 and rank what to present to the user and what not. For example, it may be the case that a user query was deemed to be related to the audio presentation, but no actions were returned, but that one or more suggestions may still be desirable to surface to the user.

Figure 3:
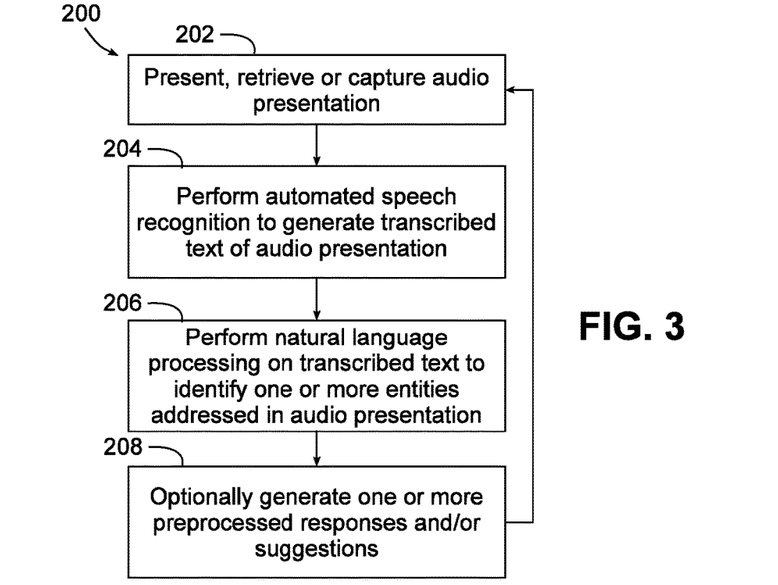
FIG. 3 is a flowchart illustrating an example sequence of operations for capturing and analyzing audio content from an audio presentation, in accordance with various implementations.
Figure 4:
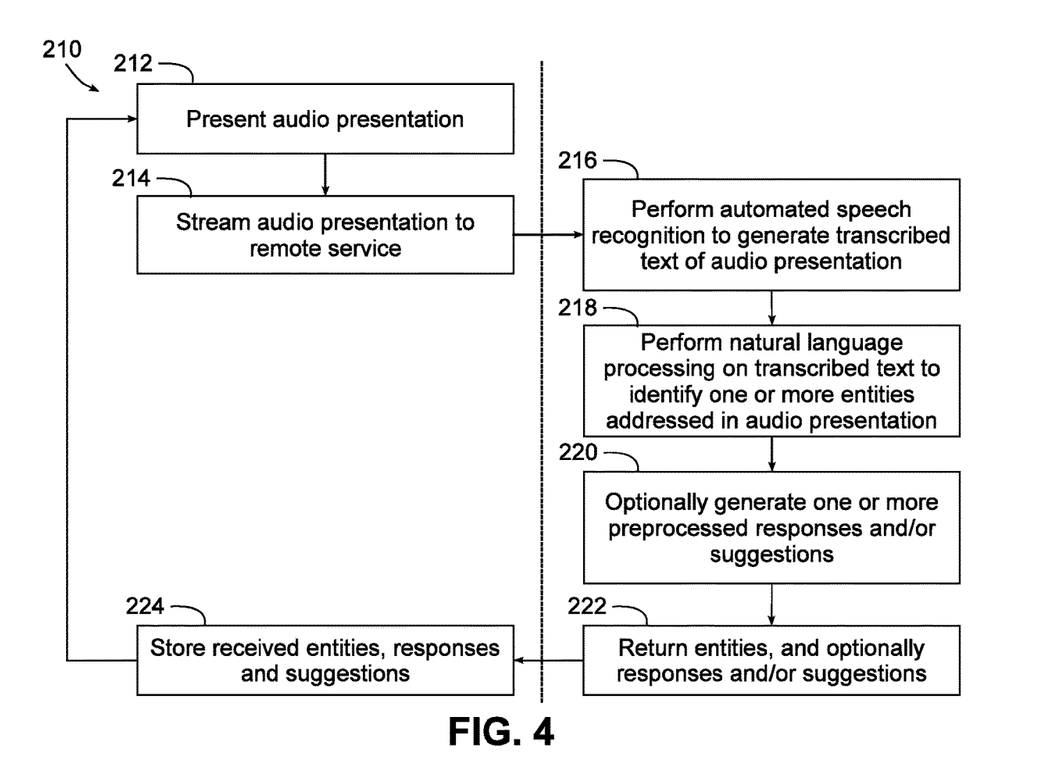
FIG. 4 is a flowchart illustrating an example sequence of operations for capturing and analyzing audio content from an audio presentation utilizing a remote service, in accordance with various implementations.
Figure 5:
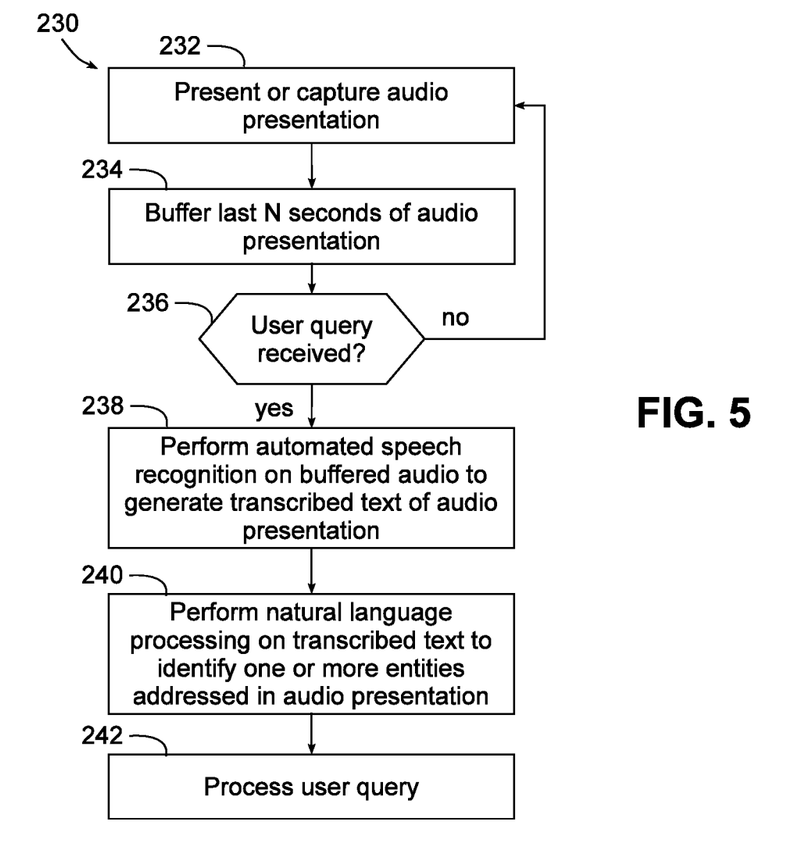
FIG. 5 is a flowchart illustrating an example sequence of operations for capturing and analyzing audio content from an audio presentation utilizing audio buffering, in accordance with various implementations.

Now turning to FIGS. 3-5, as noted above, in some embodiments, spoken audio content from an audio presentation may be analyzed in some implementations to identify various entities referenced or otherwise associated with the audio presentation. FIG. 3, for example, illustrates one example sequence of operations 200 that may be performed on an audio presentation, e.g., as may be performed by audio presentation analysis module 122 of FIG. 1. In some implementations, sequence 200 may be performed on a real-time basis, e.g., during playback of an audio presentation. In other implementations, however, sequence 200 may be performed prior to playback of an audio presentation, e.g., as part of a preprocessing operation performed on the audio presentation. In some implementations, for example, it may be desirable to preprocess multiple audio presentations in a batch process and store entities, timestamps, metadata, preprocessed suggestions, and/or preprocessed responses for later retrieval during playback of an audio presentation. Doing so may decrease the processing overhead associated with supporting user interaction with the audio presentation via the assistant device during playback. In this regard, it may be desirable to perform such batch processing by a remote or cloud-based service rather than by a single user device.

Thus, as illustrated in block 202, in order to analyze an audio presentation, the audio presentation may be presented, retrieved or captured. Presented, in this regard, generally refers to playback of the audio presentation on the assistant device, which may include local streaming or streaming from a remote device or service, and it will be appreciated that spoken audio content from the audio presentation is generally obtained as a result of presenting the audio presentation. Retrieved, in this regard, generally refers to retrieval of the audio presentation from storage. Retrieval may be coupled with playback in some instances, while in other instances, e.g., when preprocessing the audio presentation as part of a batch process, retrieval may be separate from any playback of the audio presentation. Captured, in this regard, generally refers to obtaining audio content from an audio presentation when the audio presentation is being presented by a device other than the assistant device. In some implementations, for example, an assistant device may include a microphone that may be used to capture audio played back by another device in the same environment as the assistant device, e.g., as might be played by a radio, television, home or business audio system, or another user's device.

Regardless of the source of the spoken audio content in the audio presentation, automated speech recognition may be performed on the audio content to generate transcribed text of the audio presentation (block 204), and the transcribed text may then be used to perform natural language processing to identify one or more entities addressed or otherwise associated with the audio presentation (block 206). In addition, in some implementations, one or more preprocessed responses and/or suggestions may be generated and stored based upon the identified entities (block 208), in a similar manner in which responses and suggestions are generated as described elsewhere herein. Further, as represented by the arrow from block 208 to block 202, sequence 200 in some implementations may be performed incrementally on an audio presentation, whereby playback and analysis effectively occur in parallel during playback of an audio presentation.

As noted above, various functions associated with analysis of an audio presentation may be distributed among multiple computing devices. FIG. 4, for example, illustrates a sequence of operations 210 that relies on an assistant device (left column) in communication with a remote or cloud-based service (right column) to perform real-time streaming and analysis of an audio presentation. Specifically, in block 212, an assistant device may present an audio presentation to a user, e.g., by playing back audio from the audio presentation to a user of the assistant device. During such playback, the audio presentation may also be streamed to a remote service (block 214), which performs automated speech recognition and natural language processing (blocks 216 and 218) in much the same manner as blocks 204 and 206 of FIG. 3. In addition, in some implementations, one or more preprocessed responses and/or suggestions may be generated and stored based upon the identified entities (block 220), in a similar manner to block 208 of FIG. 3, and the entities (and optionally, responses and/or suggestions) may be returned to the assistant device (block 222). The assistant device then stores the received information (block 224) and presentation of the audio presentation proceeds until the presentation ends or is prematurely paused or stopped.

Now turning to FIG. 5, in some implementations it may be desirable to defer or delay analysis of an audio presentation until necessitated by a user query, one example of which is illustrated in sequence 230. Thus, rather than continuously performing speech recognition and natural language processing on an entire audio presentation during playback, it may be desirable in some implementations to merely buffer or otherwise store audio data from an audio presentation until an appropriate user query is received, and then analyze a portion of the audio presentation (e.g., the last N seconds) proximate the particular point in the audio presentation at which a user query is received. Thus, in one representative example, if a user issues a query such as "what year did this happen?", the last 30 or so seconds of the audio presentation may be analyzed to determine that the current topic being discussed is the Battle of Verdun, and a search may be performed to generate a representative response such as "The Battle of Verdun occurred in 1916."

Thus, as illustrated in block 232, an audio presentation may be presented by an assistant device or captured (if presented by another device), with the last N seconds of the audio presentation buffered (block 234). In some instances, buffering may constitute storing captured audio data, while in other instances, e.g., where the presentation originates with the assistant device and the audio presentation is currently stored on the assistant device, buffering may include simply maintaining a reference to a range of the audio presentation preceding a current point of playback, thereby enabling the appropriate range to be retrieved from storage when analysis is desired.

Playback continues in this manner until a user query is received (block 236), and once a user query is received, automated speech recognition and natural language processing are performed on the buffered audio or range of the audio presentation (blocks 238 and 240), in a similar manner to that discussed above in connection with FIGS. 3-4. The user query is then processed (block 242), in a similar manner to that described below in connection with FIG. 7, but based principally on the analysis of the buffered portion of the audio presentation.

Figure 6:
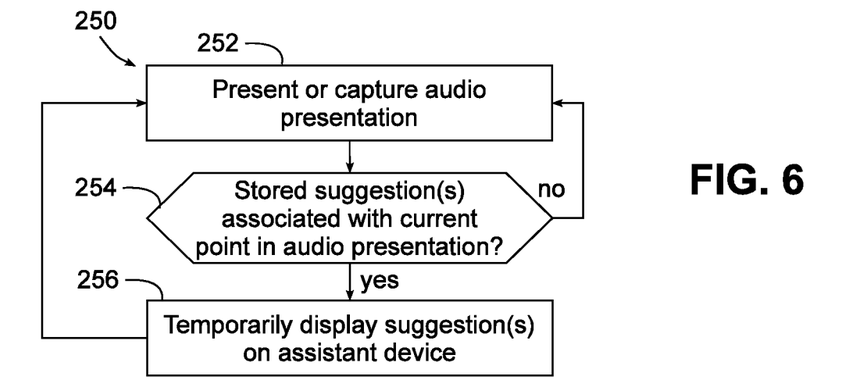
FIG. 6 is a flowchart illustrating an example sequence of operations for presenting suggestions associated with an audio presentation, in accordance with various implementations.

Now turning to FIG. 6, in some implementations it may be desirable to proactively display suggestions on an assistant device during presentation of an audio presentation, one example of which is illustrated by sequence of operations 250. Specifically, during presentation or capturing of an audio presentation (block 252) a determination may be made as to whether any stored suggestions are associated with the current point of playback in the audio presentation. If not, playback of the audio presentation continues, and control returns to block 252. If, however, any suggestions are relevant to the current point of playback, control passes to block 256 to temporarily display one or more of the suggestions on the assistant device, e.g., using cards, notifications or chips displayed on the assistant device. The suggestions may also be associated with an action in some implementations, such that user interaction with the suggestions can trigger particular actions. Thus, for example, if a particular personality is being discussed in a podcast, a suitable suggestion might state "Tap here to learn more about <personality> interviewed in Podcast," whereby selection of the suggestion may open a browser tab with additional information about the personality.

Suggestions may be generated in a number of manners in different implementations. As noted above, for example, suggestions may be generated during analysis of an audio presentation, whether in real-time during playback of the audio presentation, or in advance, e.g., as a result of preprocessing of an audio presentation. As such, a stored suggestion may have only been recently stored as the audio presentation is being analyzed. Moreover, suggestions may be associated with particular entities in some implementations, such that whenever a particular entity is referenced at a particular point during an audio presentation and identified as a result of analysis of the audio presentation, any suggestions associated with that particular entity may be retrieved, optionally ranked, and displayed to the user. Suggestions may also or alternatively be associated with particular points in an audio presentation, such that retrieval of suggestions may be based upon the current playback point of an audio presentation rather than what entities are currently being addressed in the audio presentation.

Figure 7:
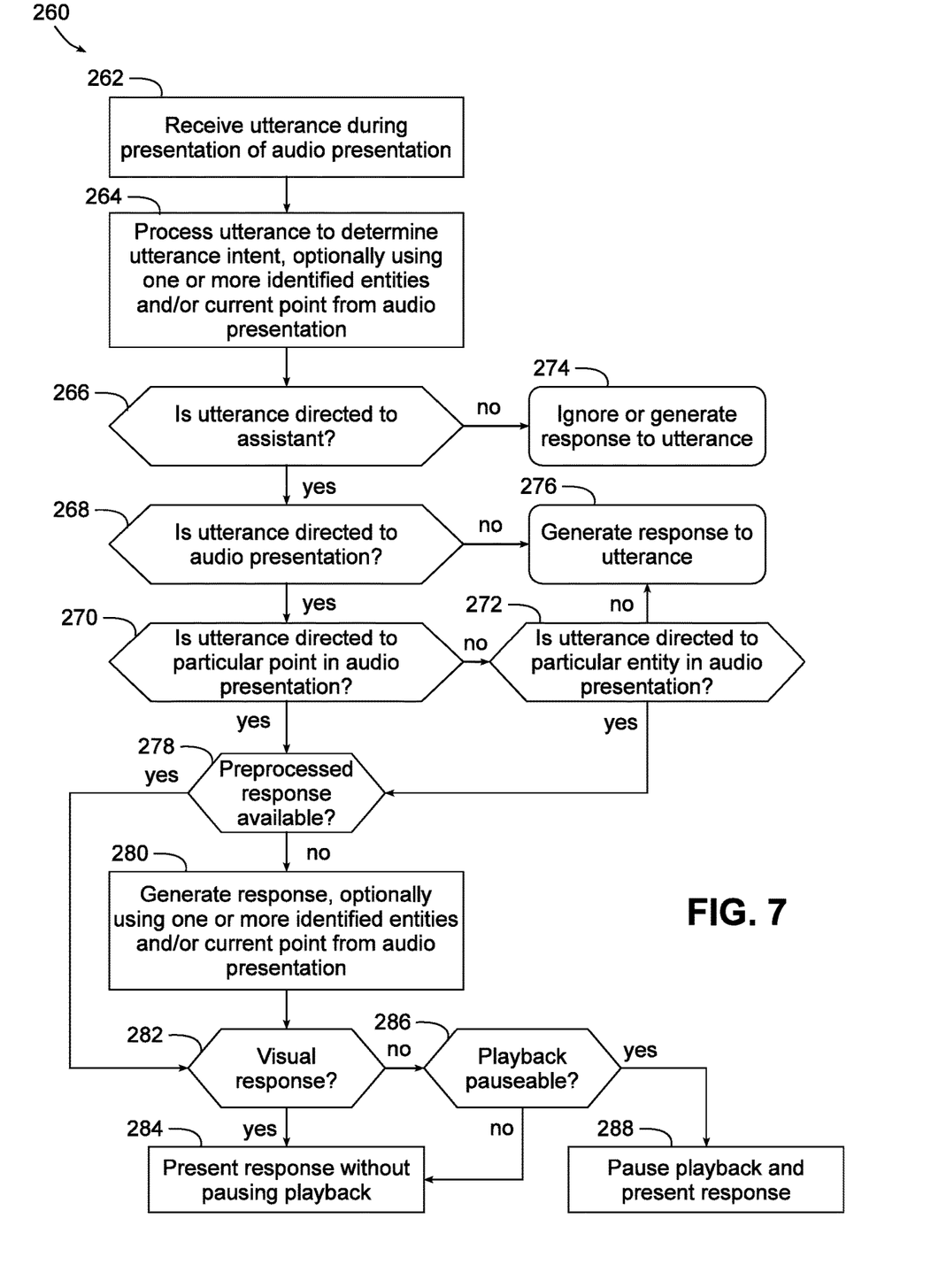
FIG. 7 is a flowchart illustrating an example sequence of operations for processing utterances and generating responses thereto, in accordance with various implementations.

FIG. 7 next illustrates an example sequence of operations 260 suitable for processing utterances or user queries, e.g., as may be performed at least in part by utterance classifier module 132 of FIG. 1, and in some implementations, using a neural network-based classifier trained to output an indication of whether a given user query is likely directed to a given audio presentation. The sequence begins by receiving an utterance during presentation of an audio presentation, e.g., as captured by a microphone of an assistant device (block 262). The utterance may then be processed (block 264) to determine the utterance intent. The utterance intent, in some instances, may be based at least in part on one or more identified entities from the audio presentation currently being presented and/or the current point of playback in the audio presentation. Classification of an utterance in some implementations may be multi-layered, and may attempt to determine one or more of (1) whether the utterance is directed to the automated assistant (e.g., as opposed to a non-query utterance directed to another individual in the environment, directed to no one in particular, or otherwise background noise), (2) whether the utterance is directed to the audio presentation (e.g., as opposed to a general query directed to the automated assistant), (3) whether the utterance is directed to a particular point in the audio presentation, or (4) whether the utterance is directed to a particular entity associated with the audio presentation. The response of the assistant device to the utterance may therefore vary based upon the classification. In addition, in some implementations acoustic echo cancellation may be utilized such that the audio presentation itself is not processed as an utterance.

In one example implementation, classification of an utterance is based on whether the utterance is directed to the assistant (block 266); if so, whether the utterance is directed more specifically to the audio presentation currently being presented (block 268); and if so, whether the utterance is directed even more specifically to a particular point in the audio presentation (block 270) or to a particular entity in the audio presentation (block 272).

If the utterance is determined to not be directed to the assistant, the utterance may be ignored, or alternatively, a response such as "I didn't understand that, could you please repeat" could be generated (block 274). If the utterance is determined to be directed to the assistant, but not specifically at the audio presentation (e.g., "what is the weather tomorrow"), a response may be generated in a conventional manner (block 276). Similarly, if the utterance is determined to be directed to the audio presentation, but not to any particular point or entity in the audio presentation (e.g., "pause podcast" or "what is this podcast called?"), an appropriate response may be generated (block 276).

If, however, the utterance classification determines that the utterance is directed to a particular point and/or entity in the audio presentation, control may pass to block 278 to optionally determine if any preprocessed response is available (e.g., as discussed above in connection with FIGS. 3-4). If response preprocessing is not used, block 278 may be omitted. If no preprocessed response is available, the response may be generated (block 280). In preparing the response, one or more identified entities and/or the current point of playback in the audio presentation may optionally be used to determine the appropriate response.

Next, if either a preprocessed response is available, or a new response has been generated, the response may be presented to the user. In the illustrated implementation, the response may be presented in a number of different manners depending upon the type of the response and the context in which it has been generated. In particular, in the illustrated implementation, a determination is made as to whether the response is a visual response (block 282), meaning that the response is capable of being presented to a user through visual means (e.g., via a display of the assistant device). If so, the response may be presented without pausing playback of the audio presentation (block 284). An example of such a response may be a notification, card or chip displayed on an assistant device stating that "The Battle of Verdun took place in 1916" in response to a query "What year did this happen" during a discussion of the Battle of Verdun. In other implementations, however, no visual responses may be supported (e.g., for a non-display assistant device), whereby block 282 may be omitted.

If the response is not a visual response, a determination may then be made as to whether playback is pauseable (block 286). Playback may not be pauseable, for example, if the playback is on a radio or otherwise on a device other than the assistant device and/or not controllable thereby, or if the audio presentation is a live stream for which it is desirable to not pause. In such an instance, control may pass to block 284 to present the response without pausing playback. If, however, the playback is pauseable, control may pass to block 288 to temporarily pause playback and present the response, and generally continue playback of the audio presentation at the completion of the response presentation.

Figure 8:
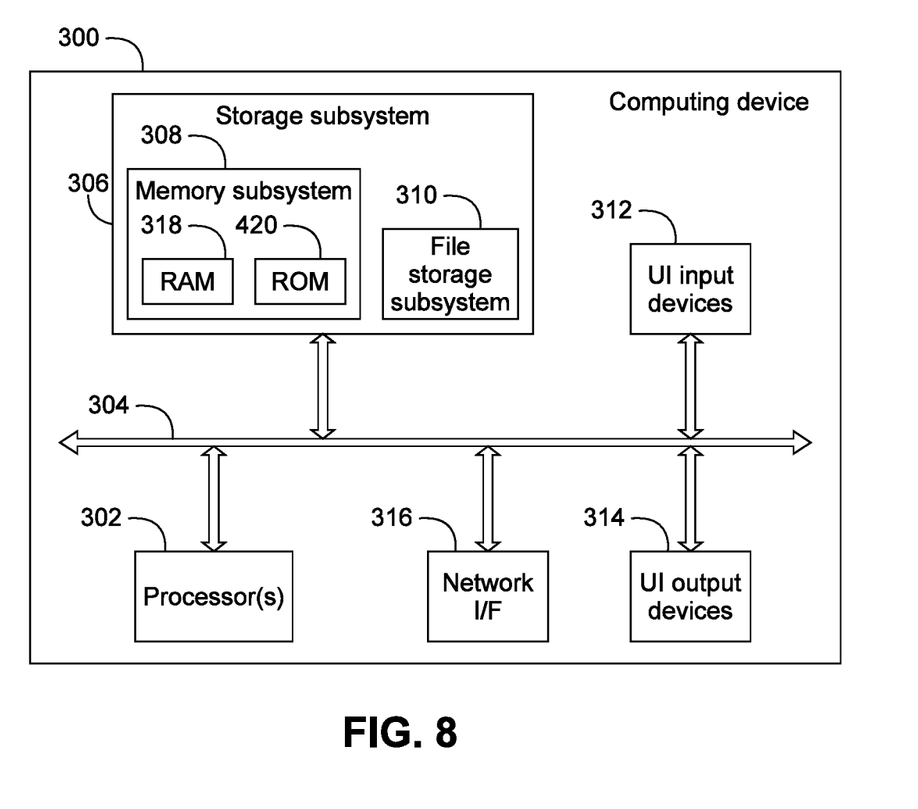
FIG. 8 illustrates an example architecture of a computing device.

FIG. 8 is a block diagram of an example computing device 300 suitable for implementing all or a part of the functionality described herein. Computing device 300 typically includes at least one processor 302 that communicates with a number of peripheral devices via bus subsystem 304. These peripheral devices may include a storage subsystem 306, including, for example, a memory subsystem 308 and a file storage subsystem 310, user interface input devices 312, user interface output devices 314, and a network interface subsystem 316. The input and output devices allow user interaction with computing device 300. Network interface subsystem 316 provides an interface to outside networks and is coupled to corresponding interface devices in other computing devices.

User interface input devices 312 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 300 or onto a communication network.

User interface output devices 314 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 300 to the user or to another machine or computing device.

Storage subsystem 306 stores programming and data constructs that provide the functionality of some or all of the modules described herein. For example, the storage subsystem 306 may include the logic to perform selected aspects of the various sequences illustrated in FIGS. 5, 7 and/or 10.

These software modules are generally executed by processor 302 alone or in combination with other processors.

Memory 308 used in the storage subsystem 306 can include a number of memories including a main random access memory (RAM) 318 for storage of instructions and data during program execution and a read only memory (ROM) 420 in which fixed instructions are stored. A file storage subsystem 310 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 310 in the storage subsystem 306, or in other machines accessible by the processor(s) 302.

Bus subsystem 304 provides a mechanism for enabling the various components and subsystems of computing device 300 to communicate with each other as intended. Although bus subsystem 304 is shown schematically as a single bus, alternative implementations of the bus subsystem may use multiple busses.

Computing device 300 can be of varying types including a mobile device, a smartphone, a tablet, a laptop computer, a desktop computer, a wearable computer, a programmable electronic device, a set top box, a dedicated assistant device, a workstation, a server, a computing cluster, a blade server, a server farm, or any other data processing system or computing device. Due to the ever-changing nature of computers and networks, the description of computing device 300 depicted in FIG. 8 is intended only as a specific example for purposes of illustrating some implementations. Many other configurations of computing device 300 are possible having more or fewer components than computing device 300 depicted in FIG. 8.

In situations in which the systems described herein collect personal information about users, or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A computer-implemented method, comprising:
analyzing spoken audio content associated with an audio presentation to identify one or more entities addressed in the audio presentation;
receiving, in an assistant device capable of generating audio responses and visual responses, first and second user queries during playback of the audio presentation;
in response to receiving the first user query:
    determining that the first user query is directed to the assistant device;
    in response to determining that the first user query is directed to the assistant device, determining that the first user query is directed to the audio presentation by determining that the first user query references at least one of the identified one or more entities; and
    in response to determining that the first user query is directed to the audio presentation, generating a first response to the first user query, wherein generating the first response to the first user query uses at least one of the identified one or more entities;
in response to receiving the second user query:
    determining that the second user query is directed to the assistant device;
    in response to determining that the second user query is directed to the assistant device, determining that the second user query is not directed to the audio presentation by determining that the second user query does not reference at least one of the identified one or more entities; and
    in response to determining that the second user query is not directed to the audio presentation, generating a second response to the second user query that is independent of the audio presentation;
determining whether the first user query can be responded to with a visual response;
in response to determining that the first user query can be responded to with a visual response, presenting the first response visually and without pausing the audio presentation;
in response to determining that the first user query cannot be responded to with a visual response, determining whether the audio presentation is being played on a pauseable device, wherein determining whether the audio presentation is being played on a pauseable device includes determining whether the audio presentation is being played on a device other than the assistant device that is not controllable by the assistant device;
in response to determining that the audio presentation is being played on a pauseable device, pausing the audio presentation and presenting the first response while the audio presentation is paused; and
in response to determining that the audio presentation is not being played on a pauseable device, presenting the first response without pausing the audio presentation.

2. The method of claim 1, wherein analyzing the spoken audio content associated with the audio presentation includes:
- executing speech recognition processing on the spoken audio content to generate transcribed text; and
- executing natural language processing on the transcribed text to identify the one or more entities.

3. The method of claim 2, wherein receiving the first and second user queries is performed on an assistant device during playback of the audio presentation by the assistant device, and wherein at least one of executing the speech recognition processing and executing the natural language processing is performed prior to playback of the audio presentation.

4. The method of claim 1, further comprising determining one or more suggestions using the identified one or more entities based on a particular point in the audio presentation.

5. The method of claim 4, further comprising presenting the one or more suggestions on an assistant device during playback of the particular point in the audio presentation by the assistant device.

6. The method of claim 1, further comprising preprocessing responses to one or more potential user queries prior to receiving the first and second user queries using the identified one or more entities.

7. The method of claim 6, wherein generating the response to the first user query includes using a preprocessed response from the one or more preprocessed responses to generate the response to the first user query.

8. The method of claim 1, wherein determining that the first user query is directed to the audio presentation includes providing transcribed text from the audio presentation and the first user query to a neural network-based classifier trained to output an indication of whether a given user query is likely directed to a given audio presentation.

9. The method of claim 1, further comprising buffering audio data from the audio presentation prior to receiving the first and second user queries, wherein analyzing the spoken audio content associated with the audio presentation includes analyzing spoken audio content from the buffered audio data after receiving the first and second user queries to identify one or more entities addressed in the buffered audio data, and wherein determining that the first user query is directed to the audio presentation or generating the first response to the first user query uses the identified one or more entities addressed in the buffered audio data.

10. The method of claim 1, wherein determining that the first user query is directed to the audio presentation includes determining that the first user query is directed to a particular point in the audio presentation.

11. The method of claim 1, wherein determining that the first user query is directed to the audio presentation includes determining that the first user query is directed to a particular entity in the audio presentation.

12. The method of claim 1, wherein determining that the second user query is not directed to the audio presentation includes determining that the second user query is a general query directed to the assistant device.

* * * * *